(12) United States Patent
Jung

(10) Patent No.: US 9,534,622 B2
(45) Date of Patent: Jan. 3, 2017

(54) SIDE BRACKET FOR HOLDING SPRINKLER JOINT

(71) Applicant: SEUNGJIN IND. CO., LTD., Ansan-si (KR)

(72) Inventor: Hye Ri Jung, Ansan-si (KR)

(73) Assignee: Seungjin Ind. Co., Ltd., Ansan-si (Gyeonggi-do) (KR)

( * ) Notice: Subject to any disclaimer, the term of this patent is extended or adjusted under 35 U.S.C. 154(b) by 0 days.

(21) Appl. No.: 14/807,021

(22) Filed: Jul. 23, 2015

(65) Prior Publication Data

US 2016/0025122 A1    Jan. 28, 2016

(30) Foreign Application Priority Data

Jul. 25, 2014 (KR) .................. 10-2014-0094725
Jul. 25, 2014 (KR) .................. 10-2014-0094727
Jan. 29, 2015 (KR) .................. 10-2015-0014335

(51) Int. Cl.
    *A47B 96/06*    (2006.01)
    *F16B 7/04*     (2006.01)
    *F16B 2/14*     (2006.01)
    *A62C 35/68*    (2006.01)

(52) U.S. Cl.
    CPC ............. *F16B 7/0493* (2013.01); *A62C 35/68* (2013.01); *F16B 2/14* (2013.01)

(58) Field of Classification Search
    CPC ......... A62C 37/00; A62C 35/00; A62C 35/68; F16L 3/24; F16B 7/0493
    See application file for complete search history.

(56) References Cited

U.S. PATENT DOCUMENTS

| 4,041,657 | A * | 8/1977 | Schuplin | ................ | E04B 9/006 248/343 |
| 6,260,810 | B1 * | 7/2001 | Choi | ......................... | F16L 3/24 248/317 |
| 7,264,214 | B2 * | 9/2007 | Oh | ......................... | A62C 35/68 169/16 |
| 7,506,845 | B2 * | 3/2009 | Oh | ........................... | F16L 3/24 248/72 |
| 2005/0139743 | A1 * | 6/2005 | Shim | ....................... | E04B 9/006 248/342 |
| 2011/0094760 | A1 * | 4/2011 | Im | ......................... | A62C 35/68 169/51 |

* cited by examiner

*Primary Examiner* — Amy Sterling
(74) *Attorney, Agent, or Firm* — Mendelsohn Dunleavy, P.C.

(57) ABSTRACT

Provided is a side bracket for holding a sprinkler joint by clamping a square bar to two channeled rails, the channeled rails being arranged in parallel at regular intervals so as to hold ceiling boards, with horizontal wings provided along opposite side edges of each of the channeled rails, and the square bar crossing the two channeled rails. The side bracket includes: a pair of support sides; an upper connection part connecting upper ends of the support sides; clamp parts provided on lower ends of the support sides so as to be clamped to a channeled rail; and a space adjustment unit provided on lower parts of the support sides of the side bracket. The side bracket can be easily and simply clamped to a wing of a channeled rail while providing a firm clamping structure.

3 Claims, 15 Drawing Sheets

SIDE BRACKET FOR HOLDING SPRINKLER JOINT

CROSS REFERENCE TO RELATED APPLICATIONS

This application claims the benefit of Korean Patent Application Nos. 10-2014-0094725, 10-2014-0094727 and 10-2015-0014335, filed on Jul. 25, 2014, Jul. 25, 2014 and Jan. 29, 2015 respectively which are hereby incorporated by reference in their entirety into this application.

BACKGROUND OF THE INVENTION

Field of the Invention

A side bracket for holding a sprinkler joint, which can form a sprinkler joint holding structure by combining a square bar with channeled rails in a lattice pattern, and which can be easily and simply clamped to a wing of a channeled rail while providing a firm clamping structure.

The present invention generally relates to a side bracket for holding a sprinkler joint. More particularly, the present invention relates to a side bracket for holding a sprinkler joint, which can form a sprinkler joint holding structure by combining a square bar with channeled rails in a lattice pattern, and which can be easily and simply clamped to a wing of a channeled rail while providing a firm structure.

Description of the Related Art

Generally, a sprinkler system is an automatic fire-fighting system configured such that a fuse of the system automatically melts in response to a fire, and water for fire-fighting is sprayed from a sprinkler head mounted to a ceiling board, thereby fighting the fire and informing persons of the fire.

FIG. 1 is a view showing a conventional sprinkler system.

As shown in FIG. 1, the conventional sprinkler system S includes: a main pipe 100' that supplies water for fire-fighting; a flexible hose 300 branching from the main pipe 100'; a reducer 400 mounted to the lower end of the flexible hose 300; and a sprinkler head 700 mounted to the lower end of the reducer 400, wherein the sprinkler head 700 is held on a ceiling board 200' by fitting the sprinkler head 700 into a through hole formed in the ceiling board 200'.

Here, the flexible hose 300, the reducer 400, and the sprinkler head 700 form a unit so-called a sprinkler joint.

FIG. 2 is a perspective view showing a conventional structure for holding a lower part of a sprinkler joint.

As shown in FIGS. 1 and 2, the conventional structure A0 for holding the sprinkler joint includes: two channeled rails 600' each having a U-shaped cross-section, the channeled rails 600' being arranged in parallel at regular intervals in a ceiling so as to hold ceiling boards 200'; a square bar 500' crossing the two channeled rails 600', and side brackets 1' that clamp the square bar 500' to the two channeled rails 600'.

The structure A0 further includes: a central holding bracket 2' that is clamped to a central portion of the square bar 500', and is provided with a through hole for holding the reducer 400, with a locking bolt 22' fastened to a connection part of the central holding bracket 2' such that the locking bolt 22' can press a side surface of the square bar 500'.

Each of the channeled rails 600' has a U-shaped cross-section that is formed by bending opposite side edges of a metal panel to form opposite wings 610' and 620'. When arranging the channeled rails 600' in the ceiling, each of the channeled rails 600' may be set on an edge such that the opposite wings 610' and 620' are placed up and down. Here, the two channeled rails 600' may be set to face each other.

The side bracket 1' having a slit on a front part thereof is fitted over the upper wing 610' of a channeled rail 600', and is fastened to the upper wing 610' by another locking bolt 11' engaged with an upper connection part of the side bracket 1', so that the side bracket 1' is clamped to the channeled rail 600'.

However, the above-mentioned structure is problematic in that because each of the channeled rails 600' is set on an edge, the contact of the channeled rail 600' with the ceiling board 200' cannot provide a sufficient contact surface, so that the structure may fail to provide a sufficient force for holding a sprinkler joint.

In an effort to solve the problem, the channeled rails 600' may be set in a ceiling such that the wide surface of each of the channeled rails 600' is laid on a ceiling board 200'. However, when setting the channeled rail 600' such that the wide surface is laid on the ceiling board 200', it is impossible to install the conventional side bracket 1' on the channeled rail 600'.

FIG. 3 is a perspective view showing another conventional structure for holding a lower part of a sprinkler joint.

The structure shown in FIG. 3 is configured such that each of opposite wings 610' of each channeled rail 600' is partially cut, and the cut portion is bent upward to stand the portion upright, thereby forming a clamp support piece 630'.

Further, the lower parts of opposite support sides of a side bracket 1' are bend inward, thereby forming opposite clamp parts 12', and another locking bolt 13' is fastened to the opposite support sides of the side bracket 1'.

Thus, this structure can fasten the side bracket 1' to a channeled rail 600' by tightening the locking bolt 13' after clamping the clamp parts 12' of the side bracket 1' to the clamp support piece 630' of the channeled rail 600'.

However, the structure of FIG. 3 is problematic in that when the structure is used over a lengthy period of time, the locking bolt 13' is gradually loosened due to repeated movement of a flexible hose 300 caused by water hammering, so that the clamping force of the structure is reduced, and the channeled rail 600' may be removed from the side bracket 1'.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a side bracket for holding a sprinkler joint, which can form a sprinkler joint holding structure by combining a square bar with channeled rails in a lattice pattern, and which can be easily and simply clamped to a wing of a channeled rail while providing a firm clamping structure.

In order to achieve the above object, according to the first embodiment of the present invention, there is provided a side bracket for holding a sprinkler joint, the side bracket being used to clamp a square bar to two channeled rails, the channeled rails being arranged in parallel at regular intervals so as to hold ceiling boards, with horizontal wings provided along opposite side edges of each of the channeled rails, and the square bar crossing the two channeled rails, the side bracket including: a pair of support sides; an upper connection part connecting upper ends of the support sides; clamp parts provided on lower ends of the support sides so as to be clamped to a channeled rail; and a space adjustment unit provided on lower parts of the support sides of the side bracket, wherein the space adjustment unit includes: an inclined plate provided on an outer surface of one of the support sides; a rotatable part arranged on the inclined plate along a diametric centerline of the inclined plate; and a locking shaft passing the pair of support sides and connecting the inclined plate and the rotatable part to each other and to the support sides.

The inclined plate may be sectioned into two parts that are opposed to each other based on the diametric centerline of the inclined plate, with a first inclined surface provided on a first side of the inclined plate, a first flat part extending from an upper end of the first inclined surface, a second inclined surface provided on a second side of the inclined plate, and a second flat part extending from an upper end of the second inclined surface.

The first flat part and the second flat part may be configured as depressions so as to prevent pressure parts of the rotatable part from being removed from the first and second flat parts.

The rotatable part may include: a grip part that is rotated by a user holding the grip part with fingers; and a pair of pressure parts that protrudes downward from the grip part and is rotated while being in contact with the inclined plate, thereby pressing down the inclined plate.

In the side bracket, a first end of the locking shaft may be combined with a central portion of the rotatable part in such a way that the rotatable part can be rotated on the locking shaft, and a second end of the locking shaft may be fixed to a remaining one of the support sides on which the space adjustment unit is not provided.

According to the second embodiment of the present invention, there is provided a side bracket for holding a sprinkler joint, the side bracket being used to clamp a square bar to two channeled rails, the channeled rails being arranged in parallel at regular intervals so as to hold ceiling boards, with horizontal wings provided along opposite side edges of each of the channeled rails, and the square bar crossing the two channeled rails, the side bracket including: a pair of support sides; an upper connection part connecting upper ends of the support sides; clamp parts provided on lower ends of the support sides so as to be clamped to a channeled rail; and a space adjustment unit provided on lower parts of the support sides of the side bracket, wherein a guide hole is provided on one of the pair of support sides, and the space adjustment unit passes through the guide hole, and includes: a fixed part fixed to an inner surface of a remaining one of the support sides; a pair of elastic parts extending upward from the fixed part and having elasticity; a pair of pressing parts bent outward from the elastic parts; and a pair of grip parts extending upward from the pressing parts.

The space adjustment unit may further include: a fitting plate that can be fitted into a gap between the pair of pressing parts, the fitting plate being configured such that when the fitting plate is fitted into the gap between the pair of pressing parts, the fitting plate pushes the pressing parts in opposite directions, thereby holding the pressing parts at opened positions, and such that the fitting plate can be removably fitted into the gap between the pair of pressing parts by being slidably moved while being in contact with the support side having the guide hole; and a holder that is provided on the support side having the guide hole so as to hold the fitting plate such that even when the fitting plate is removed from the gap between the pair of pressing parts, the fitting plate is maintained in a contact position on the support side having the guide hole.

In the side bracket, a ridge may be integrally formed on each of the support sides.

In the side bracket, the space adjustment unit may be made of a plate spring material.

According to the third embodiment of the present invention, there is provided a side bracket for holding a sprinkler joint, the side bracket being used to clamp a square bar to channeled rails, the channeled rails being arranged in parallel at regular intervals so as to hold ceiling boards, with horizontal wings provided along opposite side edges of each of the channeled rails, and the square bar crossing the channeled rails, the side bracket including: a pair of support sides, with a through hole formed through each of the support sides so that the square bar can pass through the through holes of the support sides; an upper connection part connecting upper ends of the support sides; clamp parts provided on lower ends of the support sides so as to be clamped to a channeled rail; and a space adjustment unit provided between lower parts of the support sides, wherein a locking piece part is provided on the lower parts of the pair of support sides such that the locking piece part can be engaged with or disengaged from the space adjustment unit, so that when the locking piece part is engaged with the space adjustment unit, the locking piece part clamps the side bracket to a wing of the channeled rail.

The space adjustment unit may include: a block body placed between the pair of support sides; rotating shafts extending from opposite side surfaces of the block body and inserted into shaft holes provided in the pair of support sides; and a locking shaft extending from a surface of the block body such that the locking shaft extends in a direction perpendicular to an axis of the rotating shafts.

Here, the locking shaft may be configured as a hollow pipe, and may be provided with an axial slit that gives a clearance to the locking shaft.

The axial slit may be configured such that opposed edge surfaces of the axial slit are inclined to be further opened as the axial slit goes in a radially outward direction toward an outer circumferential surface of the locking shaft.

The locking piece part may include: a first locking piece and a second locking piece that are provided by partially cutting the pair of support sides so as to form cut parts and by bending the cut parts inwards.

Here, each of the first and second locking pieces may be provided with a U-shaped fitting slit extending downward to a depth, so that the locking shaft of the space adjustment unit can be inserted into the fitting slits of the first and second locking pieces.

The fitting slits may be configured such that when the locking shaft is completely fitted into the fitting slits, the locking shaft can be placed horizontally.

Further, the fitting slits may include: a first fitting slit provided in the first locking piece; and a second fitting slit provided in the second locking piece, wherein locations of the first and second fitting slits may be determined such that when the pair of support sides is compressed, the fitting slits are aligned with each other.

Further, the lengths of the rotating shafts may be determined such that even when the support sides are opened from each other, the rotating shafts can be maintained in the respective shaft holes.

As described above, the present invention is advantageous in that when forming a sprinkler joint holding structure by combining a square bar with channeled rails in a lattice pattern, the side bracket of the present invention can be easily and simply clamped to a wing of a channeled rail.

Another advantage of the present invention resides in that the clamped state of the side bracket is less likely to be loosened after clamping the side bracket to the wing of the channeled rail.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
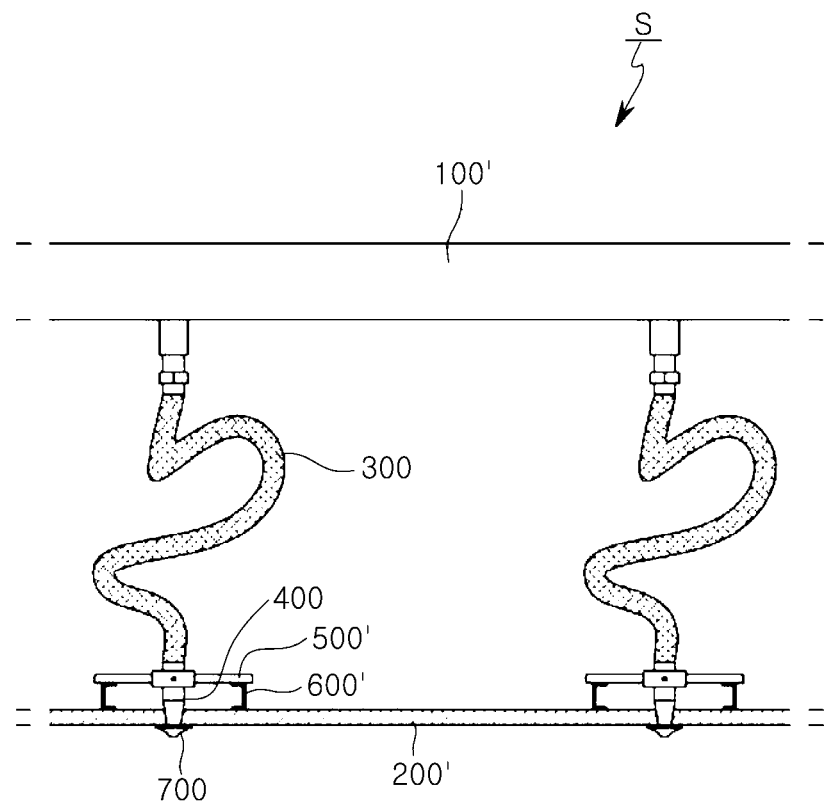
FIG. 1 is a view showing a conventional sprinkler system.

Hereinbelow, exemplary embodiments of a side bracket for holding a sprinkler joint according to the present invention will be described in detail with reference to the accompanying drawings. Throughout the drawings, the same reference numerals will refer to the same or like parts.

Figure 4:
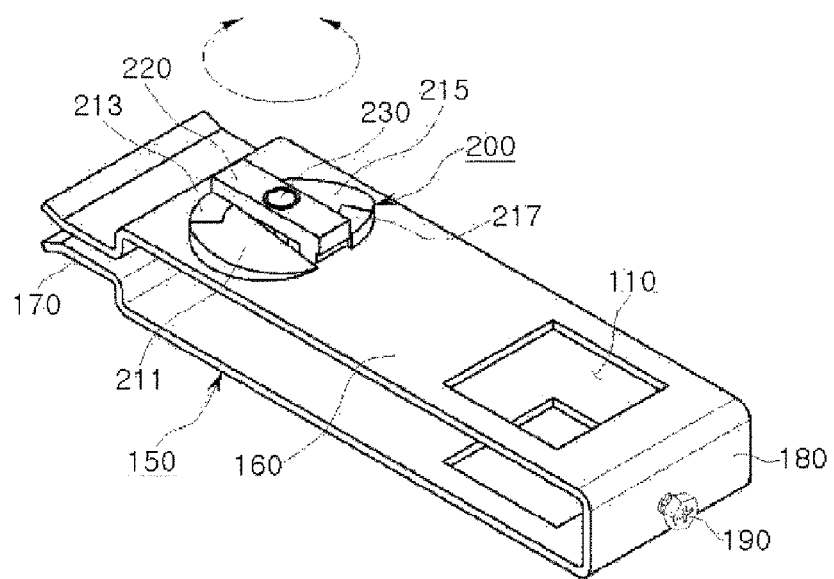
FIG. 4 is a perspective view showing a side bracket for holding the sprinkler joint according to the first embodiment of the present invention.
Figure 5:
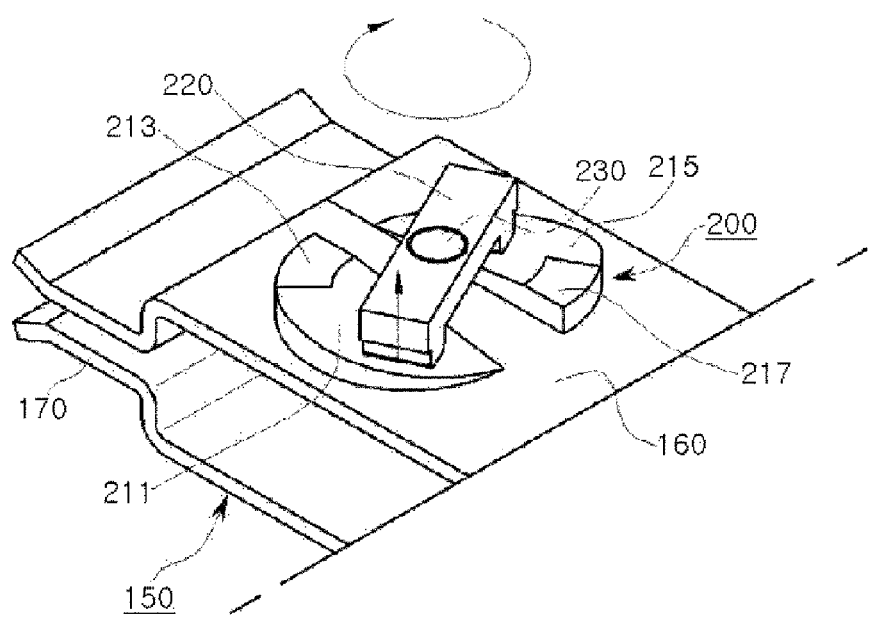
FIG. 5 is a perspective view showing an operation of the side bracket for holding the sprinkler joint according to the first embodiment of the present invention.
Figure 6:
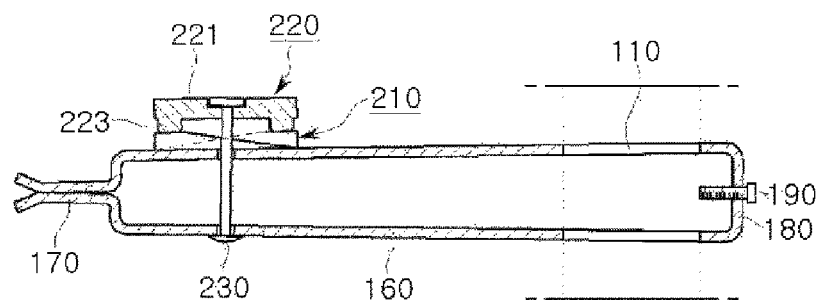
FIG. 6 is a sectional view showing the side bracket for holding the sprinkler joint according to the first embodiment of the present invention.

FIG. 4 is a perspective view showing a side bracket for holding a sprinkler joint according to the first embodiment of the present invention. FIG. 5 is an enlarged perspective view of a space adjustment unit of the side bracket shown in FIG. 4. FIG. 6 is a sectional view of FIG. 4.

As shown in FIGS. 4 to 6, the side bracket 150 according to the first embodiment of the present invention is used to clamp a square bar 500 to two channeled rails 600. Here, the channeled rails 600 are arranged in parallel at regular intervals in a ceiling so as to hold ceiling boards 200', with horizontal wings provided along opposite side edges of each of the channeled rails 600. The square bar 500 crosses the two channeled rails 600.

Figure 2:
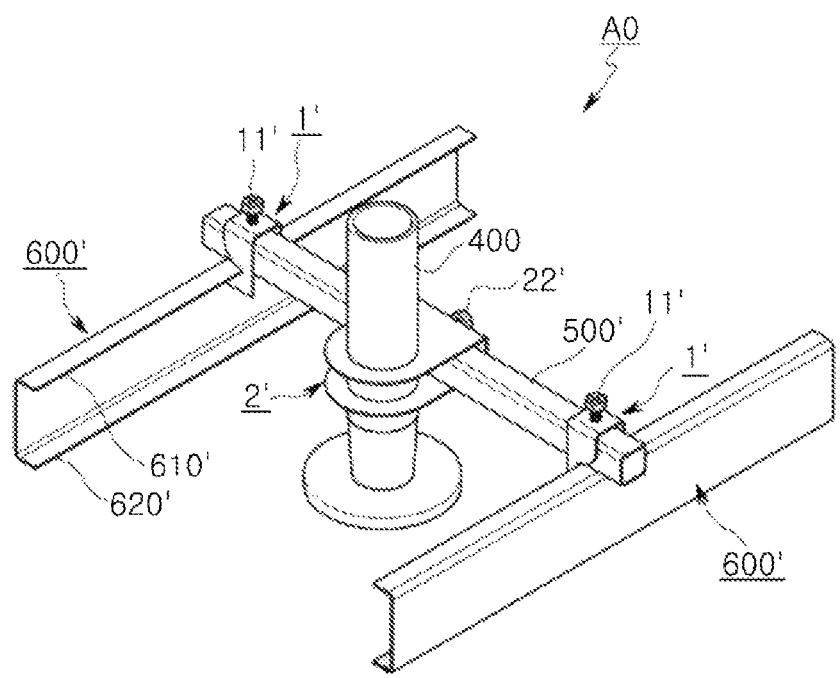
FIG. 2 is a perspective view showing a conventional structure for holding a lower part of a sprinkler joint.
Figure 3:
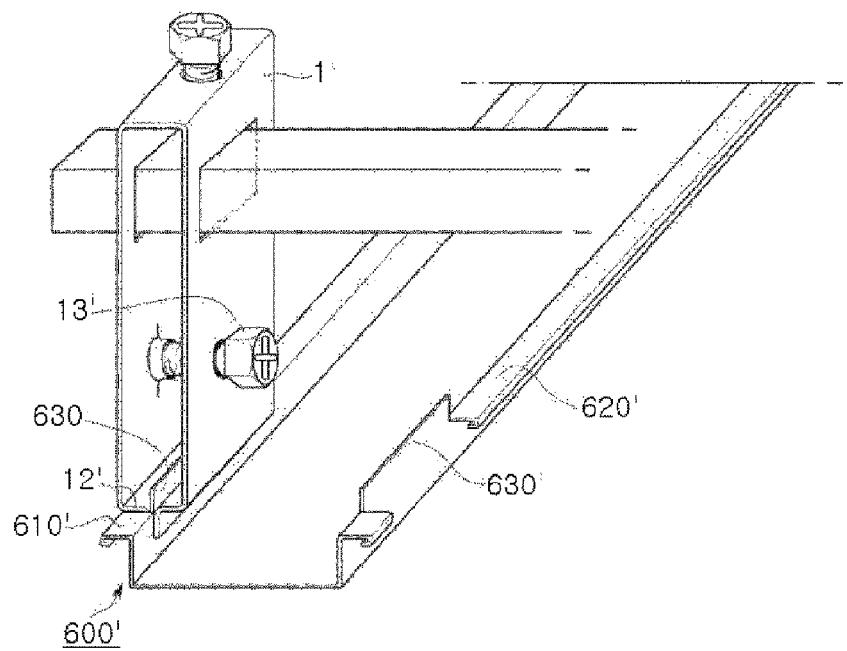
FIG. 3 is a perspective view showing another conventional structure for holding a lower part of a sprinkler joint.

Further, a reducer 400 (see FIG. 2) may be clamped to a central portion of the square bar 500 using a central holding bracket, with a sprinkler head being mounted to the reducer.

The side bracket 150 includes: a pair of support sides 160; an upper connection part 180 that connects the upper ends of the support sides 160; and clamp parts 170 provided on the lower ends of the support sides 160 so as to clamp the side bracket 150 to a channeled rail 600.

A space adjustment unit 200 is provided on lower parts of the support sides 160 of the side bracket 150, and a through hole 110 is formed through an upper part of each of the support sides 160 so that the square bar 500 can pass through the through holes 110 of the support sides 160.

The space adjustment unit 200 is a device that controls the gap between the pair of support sides 160 so that the clamp parts 170 can be opened or closed by the operation of the space adjustment unit 200.

Accordingly, the pair of clamp parts 170 can be firmly clamped to the channeled rail 600 by tightly compressing the clamp parts 170 with the channeled rail 600 interposed between the clamp parts 170.

The space adjustment unit 200 includes: an inclined plate 210 provided on the outer surface of one of the support sides 160; a rotatable part 220 arranged on the inclined plate 210 along a diametric centerline of the inclined plate 210; and a locking shaft 230 that passes the pair of support sides 160 and connects the inclined plate 210 and the rotatable part 220 to each other and to the support sides 160.

The inclined plate 210 is sectioned into two parts that are opposed to each other based on the diametric centerline of the inclined plate 210. On the inclined plate 210, a first inclined surface 211 is provided on a first side of the inclined plate 210, a first flat part 213 extends from an upper end of the first inclined surface 211, a second inclined surface 215 is provided on a second side of the inclined plate 210, and a second flat part 217 extends from an upper end of the second inclined surface 215.

Further, the rotatable part 220 is rotatably arranged along the diametric centerline of the inclined plate 210, and includes: a grip part 221 that is rotated by a user holding the grip part 221 with fingers; and a pair of pressure parts 223 that protrudes downward from the grip part 221 and is rotated while being in contact with the inclined plate 210, thereby pressing down the inclined plate 210.

Here, the pair of pressure parts 223 is rotated while being in contact with the first inclined surface 211 and the second inclined surface 215, respectively, thereby pressing down the first and second inclined surfaces 211 and 215. The pair of pressure parts 223 stops the rotation thereof when reaching the first flat part 213 and the second flat part 217, respectively.

Here, the first flat part 213 and the second flat part 217 may be configured as shallow depressions so as to prevent the two pressure parts 223 from being removed from the flat parts 213 and 217.

The first end of the locking shaft 230 is combined with the central portion of the grip part 221 of the rotatable part 220 in such a way that the rotatable part 220 can be rotated on the locking shaft 230. The second end of the locking shaft 230 is fixed to a remaining one of the support sides 160 on which the space adjustment unit 200 is not provided.

Further, a locking bolt 190 is fastened to the upper connection part 180 of the side bracket 150. In the same manner as that described for the conventional structure, the locking bolt 190 functions to fasten the square bar 500 that passes through the through holes 110.

Hereinbelow, the operation of the side bracket for holding the sprinkler joint according to the first embodiment of the present invention will be described.

To clamp the square bar 500 to each of the two channeled rails 600 that are arranged in parallel at regular intervals in the ceiling so as to hold the ceiling boards, the side bracket 150 is installed on each of the channeled rails 600.

In other words, after fitting the clamp parts 170 of the side bracket 150 over the wing of the channeled rail 600, the rotatable part 220 of the space adjustment unit 200 is rotated.

When rotating the rotatable part 220 as described above, the pair of pressure parts 223 moves toward the upper parts of the first and second inclined surfaces 211 and 215 of the inclined plate 210 while being in contact with the inclined surfaces 211 and 215, respectively. When the two pressure parts 223 move on the respective inclined surfaces 211 and 215 as described above, the pressure parts 223 press the inclined plate 210 so that the support side 160 having the inclined plate 210 is pressed along the locking shaft 230 in a direction toward the support side 160 having no inclined plate 210.

Accordingly, the clamp parts 170 integrated with the support sides 160 are tightly closed, and compress the wing of the channeled rail 600 placed between the clamp parts 170, so that the side bracket 150 is tightly clamped to the channeled rail 600.

Here, after the pressure parts 223 pass over the upper parts of the first and second inclined surfaces 211 and 215, the pressure parts 223 are seated on the first flat part 213 and the second flat part 217, respectively. On the first flat part 213 and the second flat part 217, the pressure parts 223 are stably seated without further moving.

Figure 7:
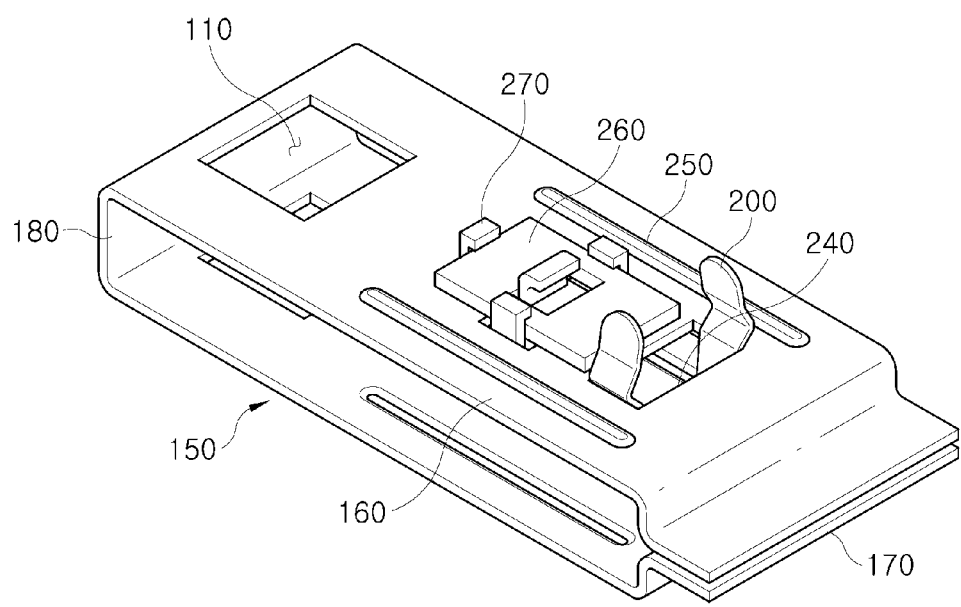
FIG. 7 is a perspective view showing a side bracket for holding a sprinkler joint according to the second embodiment of the present invention.
Figure 8:
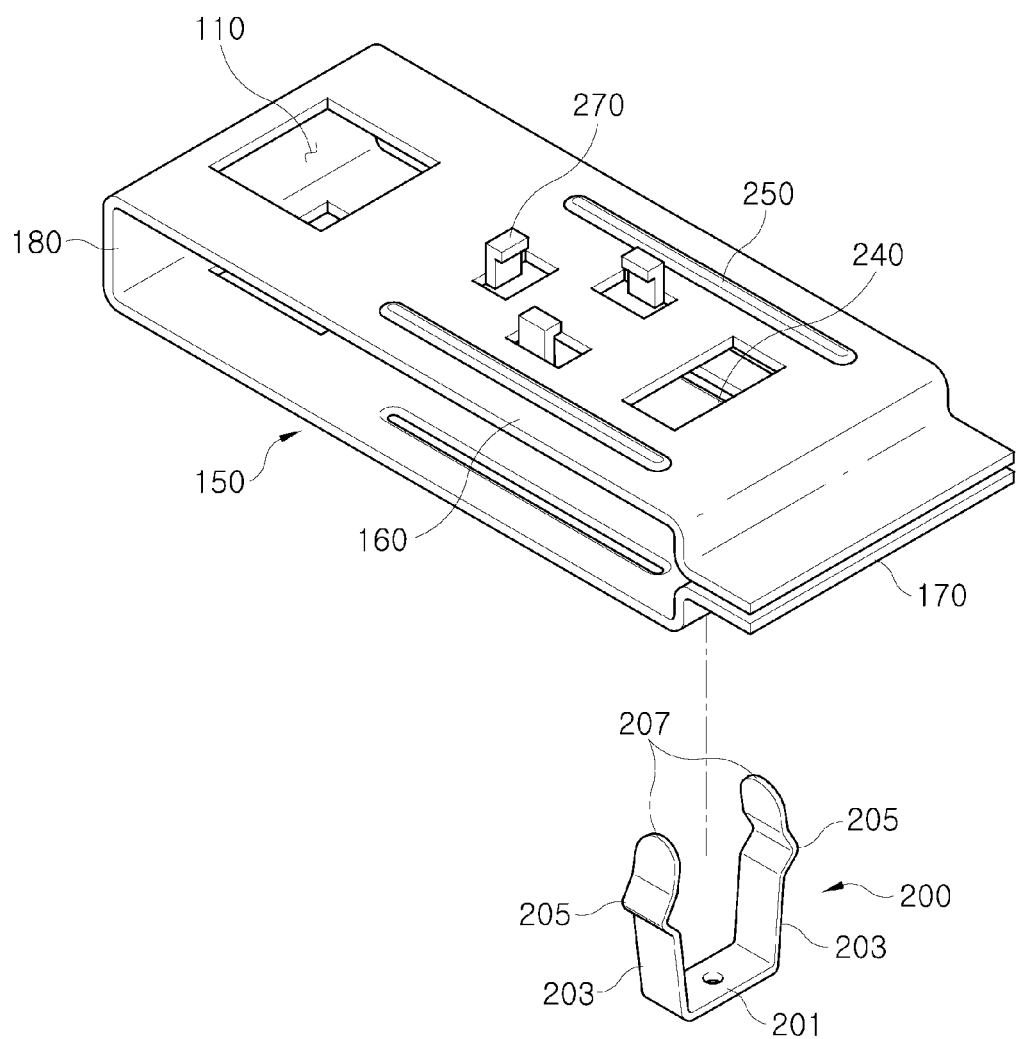
FIG. 8 is an exploded perspective view showing the side bracket for holding the sprinkler joint of FIG. 7.
Figure 9:
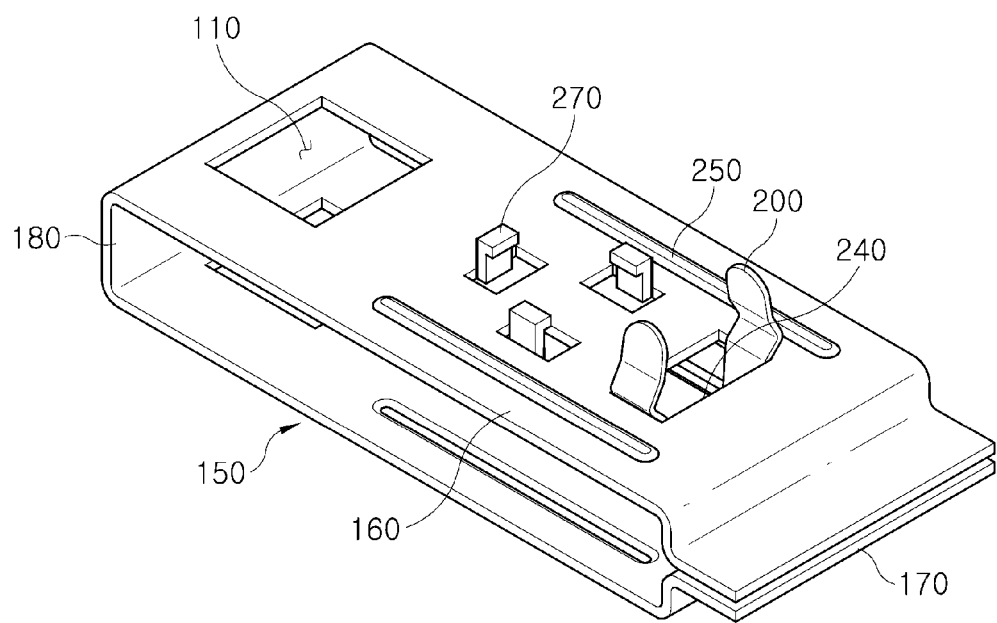
FIGS. 9 and 10 are perspective views showing an operation of the side bracket for holding the sprinkler joint according to the second embodiment of the present invention.
Figure 10:
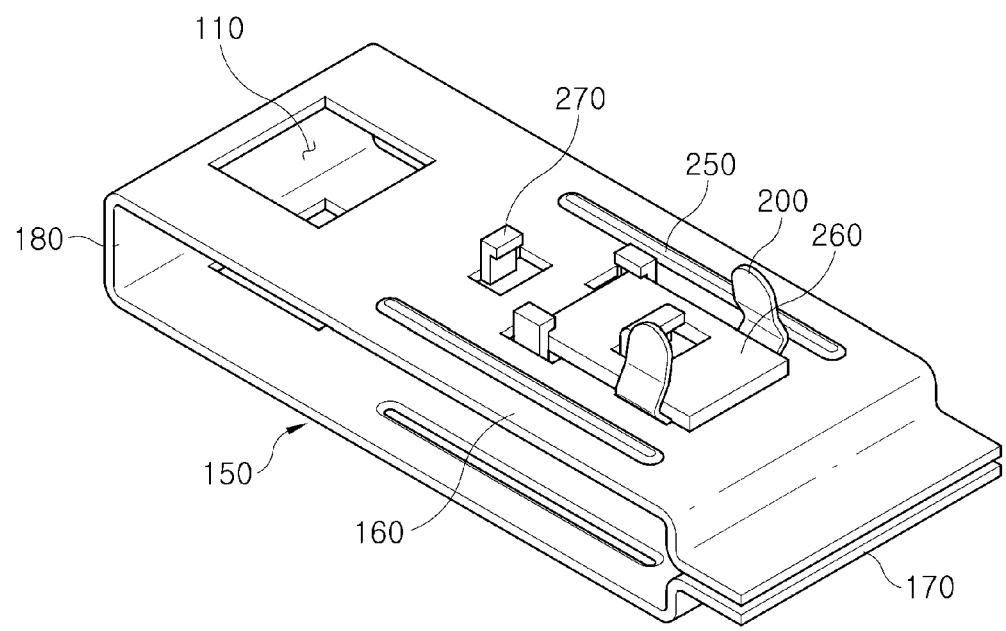
Figure 11:
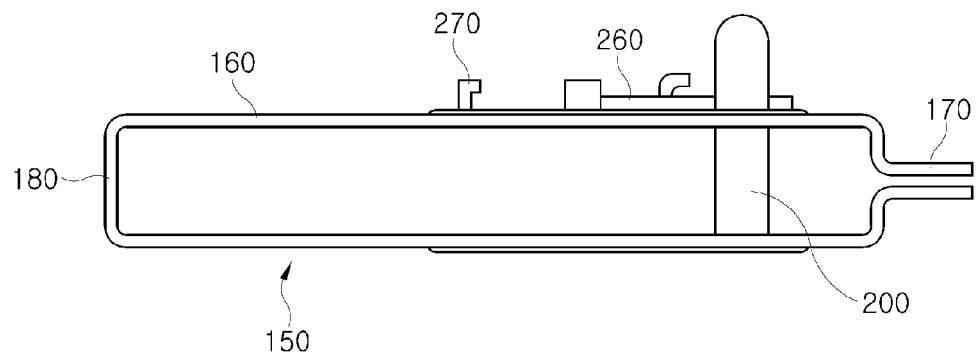
FIG. 11 is a side view showing the side bracket for holding the sprinkler joint according to the second embodiment of the present invention.

FIG. 7 is a perspective view showing a side bracket for holding a sprinkler joint according to the second embodiment of the present invention. FIG. 8 is an exploded perspective view showing the side bracket for holding the sprinkler joint of FIG. 7. FIGS. 9 and 10 are perspective views showing an operation of the side bracket for holding the sprinkler joint according to the second embodiment of the present invention. FIG. 11 is a side view showing the side bracket for holding the sprinkler joint according to the second embodiment of the present invention.

As shown in FIGS. 7 to 9, the side bracket 150 for holding the sprinkler joint according to the second embodiment of the present invention is used to clamp a square bar 500 to two channeled rails 600. Here, the channeled rails 600 are arranged in parallel at regular intervals in a ceiling and used to hold ceiling boards 200', with horizontal wings provided along opposite side edges of each of the channeled rails 600. The square bar 500 crosses the two channeled rails 600.

Further, a reducer 400 (see FIG. 2) may be clamped to a central portion of the square bar 500 using a central holding bracket, with a sprinkler head being mounted to the reducer.

The side bracket 150 includes: a pair of support sides 160; an upper connection part 180 that connects the upper ends of the support sides 160; and clamp parts 170 provided on the lower ends of the support sides 160 so as to clamp the side bracket 150 to a channeled rail 600.

One of the pair of support sides 160 is provided with a guide hole 240 at a predetermined position. Further, a ridge 250 is integrally formed on each of the support sides 160. Here, the ridge 250 has a profile that extends outside the guide hole 240. Although the guide hole 240 is configured as a rectangular shape in the embodiment of the present invention, it should be understood that the shape of the guide hole 240 may be freely changed as desired.

A through hole 110 is formed through an upper part of each of the support sides 160 so that the square bar 500 can pass through the through holes 110 of the support sides 160.

In the second embodiment, the ridge 250 is provided as a reinforcement part that increases the strength of the support sides 160.

A space adjustment unit 200 is installed in the side bracket 150 by passing through the guide hole 240. In other words, the first end of the space adjustment unit 200 is fixed to the inner surface of the support side 160 having no guide hole 240, and the second end of the space adjustment unit 200 passes through the guide hole 240 to be exposed outside the support side 160 having the guide hole 240.

The space adjustment unit 200 is a device that controls the gap between the pair of support sides 160 so that the clamp parts 170 can be opened or closed by the operation of the space adjustment unit 200.

Accordingly, the pair of clamp parts 170 can be firmly clamped to the channeled rail 600 by tightly compressing the clamp parts 170 with the channeled rail 600 interposed between the clamp parts 170.

As shown in FIG. 8, the space adjustment unit 200 includes: a fixed part 201 fixed to the inner surface of the support side 160 having no guide hole 240; a pair of elastic parts 203 extending upward from the fixed part 201 and having elasticity; a pair of pressing parts 205 bent outward from the elastic parts 203 to form respective ridges; and a pair of grip parts 207 extending upward from the pressing parts 205.

Here, the space adjustment unit 200 may be made of a plate spring material.

Further, a locking bolt (not shown) is fastened to the upper connection part 180 of the side bracket 150. In the same manner as that described for the conventional structure, the locking bolt functions to fasten the square bar 500 that passes through the through holes 110.

Here, to realize firmer clamping of the space adjustment unit 200 according to the second embodiment of the present invention, the space adjustment unit 200 may further include a fitting plate 260 that can be fitted into the gap between the pair of pressing parts 205.

The width of the fitting plate 260 is determined such that when the fitting plate 260 is fitted into the gap between the pair of pressing parts 205, the fitting plate 260 can push the pressing parts 205 in opposite directions, thereby holding the pressing parts 205 at opened positions. Further, the fitting plate 260 is configured to be removably fitted between the pair of pressing parts 205 by being slidably moved while being in contact with the support side 160 having the guide hole 240. To this end, a holder 270 may be provided on the support side 160 having the guide hole 240. The holder 270 can hold the fitting plate 260 such that even when the fitting plate 260 is removed from the gap between the pair of pressing parts 205, the fitting plate 260 can be maintained in a contact position on the support side 160 having the guide hole 240.

Hereinbelow, the operation of the side bracket for holding the sprinkler joint according to the second embodiment of the present invention will be described.

To clamp the square bar 500 to each of the two channeled rails 600 that are arranged in parallel at regular intervals in the ceiling so as to hold the ceiling boards, the side bracket 150 is installed on each of the channeled rails 600. At this time, the pressing parts 205 of the space adjustment unit 200 are placed between the pair of support sides 160 of the side bracket 150.

In other words, after fitting the clamp parts 170 of the side bracket 150 over the wing of the channeled rail 600, the pair of pressing parts 205 of the space adjustment unit 200 is pulled to be exposed outside the support side 160 having the guide hole 240 while compressing the pair of grip parts 207 with fingers gripping the grip parts 207 so as to reduce the gap between the support sides 160. When the pair of grip parts 207 is released after exposing the pressing parts 205 outside the support side 160, the pressing parts 205 are opened and placed on opposite edges of the guide hole 240 under pressure, thereby compressing the pair of support sides 160.

Accordingly, the gap between the support sides 160 is reduced and the clamp parts 170 integrated with the support sides 160 are tightly closed, and compress the wing of the channeled rail 600 placed between the clamp parts 170, so that the side bracket 150 is tightly clamped to the channeled rail 600.

Figure 12:
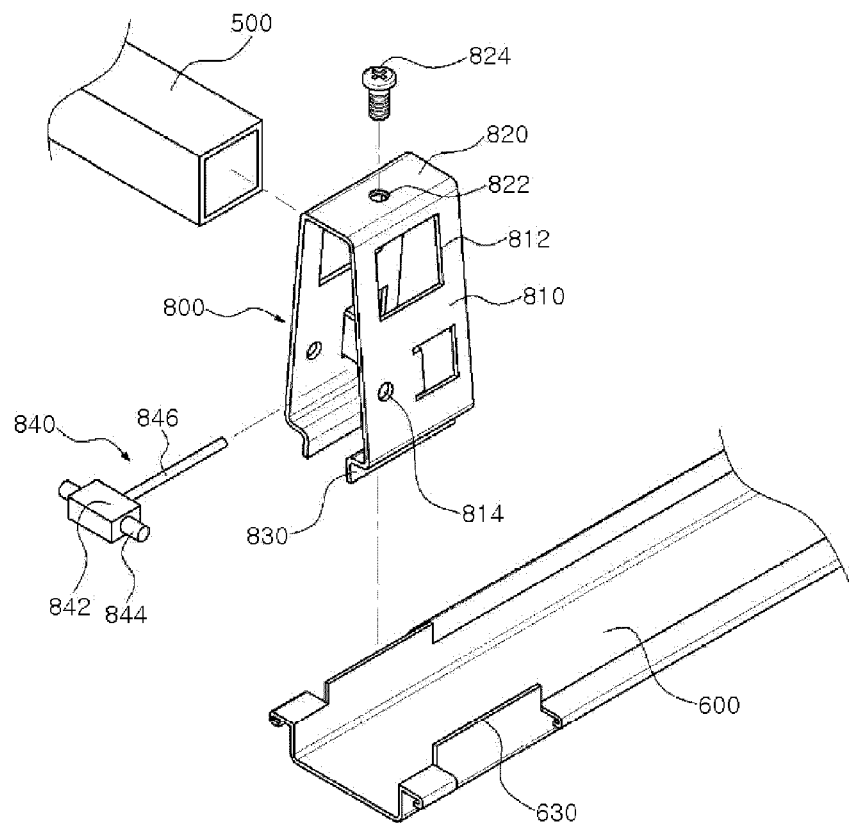
FIG. 12 is an exploded perspective view showing a side bracket for holding a sprinkler joint according to the third embodiment of the present invention.
Figure 13:
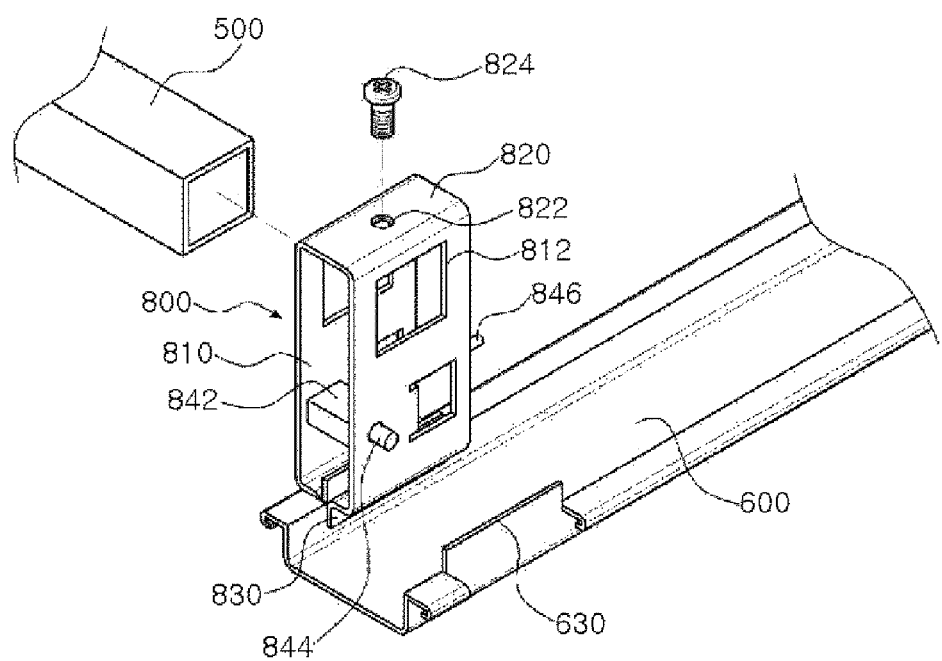
FIG. 13 is a perspective view showing a state of the side bracket of FIG. 12 clamped to a wing of a channel rail.

FIG. 12 is an exploded perspective view showing a side bracket for holding a sprinkler joint according to the third embodiment of the present invention. FIG. 13 is a perspective view showing a clamped state of the side bracket for holding the sprinkler joint of FIG. 12;

As shown in FIGS. 12 and 13, the side bracket 800 for holding the sprinkler joint according to the third embodiment of the present invention is used to clamp a square bar 500 to two channeled rails 600. Here, the channeled rails 600 are arranged in parallel at regular intervals in a ceiling and used to hold ceiling boards, with horizontal wings 630 provided along opposite side edges of each of the channeled rails 600. The square bar 500 crosses the two channeled rails 600.

Further, a reducer 400 (see FIG. 2) may be clamped to a central portion of the square bar 500 using a central holding bracket, with a sprinkler head being mounted to the reducer.

The side bracket 800 includes: a pair of support sides 810 having respective through holes 812 through which the square bar 500 can pass; an upper connection part 820 that connects the upper ends of the support sides 810; and clamp parts 830 provided on the lower ends of the support sides 810 so as to clamp the side bracket 800 to a channeled rail 600.

Further, a locking bolt 824 is fastened to the upper connection part 820 of the side bracket 800. In the same manner as that described for the conventional structure, the locking bolt 824 functions to fasten the square bar 500 that passes through the through holes 812. The upper connection part 820 is provided with an internally threaded hole 822 to which the locking bolt 824 is tightened.

A space adjustment unit 840 is installed between the lower parts of the support sides 810. The space adjustment unit 840 is a device that controls the gap between the pair of support sides 810 so that the clamp parts 830 can be opened or closed by the operation of the space adjustment unit 840.

Accordingly, the pair of clamp parts 830 can be firmly clamped to the channeled rail 600 by tightly compressing the clamp parts 830 with the channeled rail 600 interposed between the clamp parts 830.

In the present invention, the space adjustment unit 840 includes: a block body 842 placed between the pair of support sides 810; rotating shafts 844 extending from opposite side surfaces of the block body 842 and inserted into shaft holes 814 provided in the pair of support sides 810; and a locking shaft 846 extending from a surface of the block body 842 such that the locking shaft 846 extends in a direction perpendicular to an axis of the rotating shafts 844.

Here, each of the rotating shafts 844 and the locking shaft 846 may be configured as a bar shape, and the block body 842 may be configured as a hexahedral shape. Here, the block body 842 may have a width that is equal to the gap between the pair of support sides 810 when the support sides 810 are compressed. Further, when assuming the axial direction of the side bracket 800 as a vertical direction in FIG. 17, the opposite side surfaces of the block body 842 may be configured as parallel vertical surfaces. Thus, when the support sides 810 are compressed, the opposite side surfaces of the block body 842 are brought into contact with the inner surfaces of associated support sides 810 while being in parallel to the inner surfaces of the support sides 810.

The block body 842 and the locking shaft 846 of the space adjustment unit 840 can rotate about the rotating shafts 844 that are inserted into the respective shaft holes 814 of the support sides 810. Here, the block body 842 and the locking shaft 846 can rotate at a predetermined angle, for example, 90° or more.

Further, a locking piece part 850 is provided on the lower parts of the pair of support sides 810 such that the locking piece part 850 can be engaged with or disengaged from the space adjustment unit 840. When the locking piece part 850 is engaged with the space adjustment unit 840, the locking piece part 850 clamps the side bracket 800 to a wing 630 of a channeled rail 600.

Figure 14A:
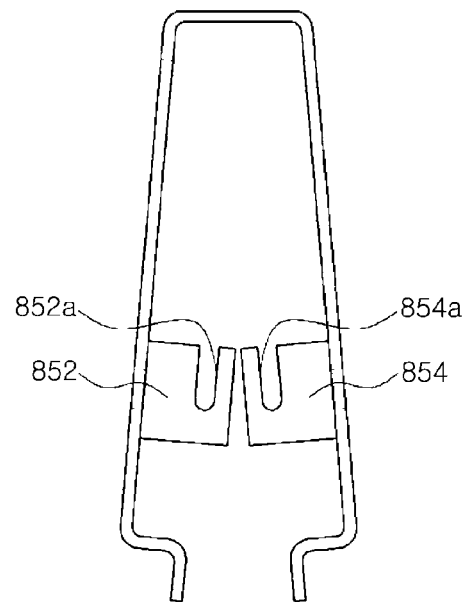
FIGS. 14A and 14B are side views showing an operation of the side bracket according to the third embodiment of the present invention in which the space between the support sides of the side bracket is increased or reduced.
Figure 14B:
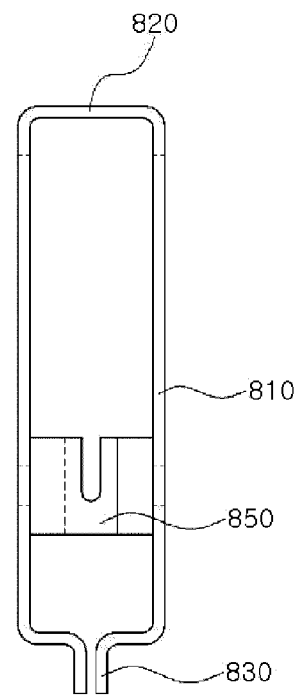
Figure 15:
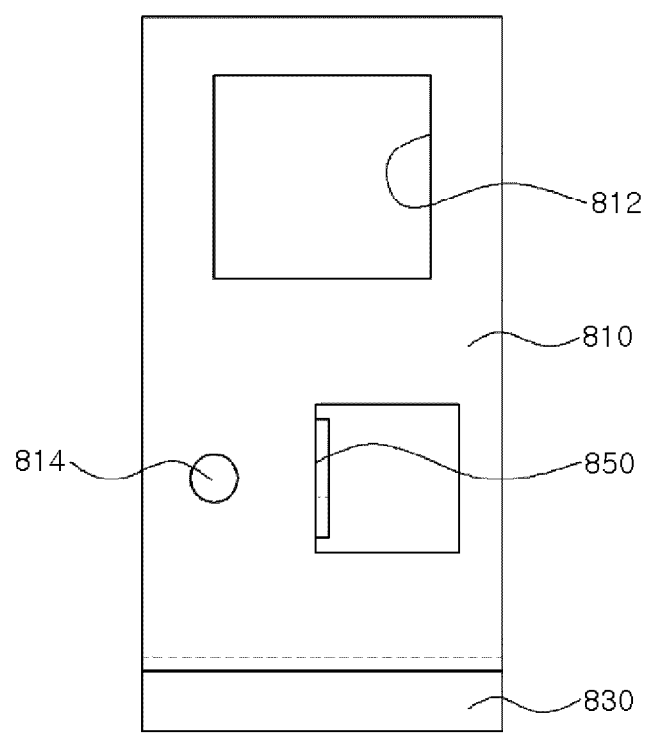
FIG. 15 is a front view showing one of the support sides of the side bracket according to the third embodiment of the present invention.

FIGS. 14A and 14B are side views showing an operation of the side bracket according to the third embodiment of the present invention in which the space between the support sides of the side bracket is increased or reduced. FIG. 15 is a front view showing one of the support sides of the side bracket according to the third embodiment of the present invention;

As shown in the drawings, the locking piece part 850 may be provided by partially cutting the support sides 810 to form cut parts and by bending the cut parts inwards. In other words, although the locking piece part 850 may be provided by mounting a separate locking piece part to the support sides through, for example, welding, it is most preferred that the locking piece part 850 is provided by partially cutting the support sides 810 and by bending the cut parts inwards when considering the manufacturing cost and work efficiency.

Here, because the side bracket of the present invention 810 includes the pair of the support sides, the locking piece part 850 may comprise a first locking piece 852 and a second locking piece 854 that are provided by partially cutting the pair of support sides 810 so as to form cut parts and by bending the cut parts inwards.

As described above, the locking piece part 850 is configured to be engaged with or disengaged from the space adjustment unit 840, thereby closing or opening the pair of support sides 810. To this end, the first locking piece 852 and the second locking piece 854 are provided with U-shaped fitting slits 852a and 854a, respectively. Here, each of the U-shaped fitting slits 852a and 854a extends downward to a depth so that when the two fitting slits 852a and 854a are aligned with each other, the locking shaft 846 of the space adjustment unit 840 can be inserted into the two fitting slits 852a and 854a.

The fitting slits 852a and 854a comprise: a first fitting slit 852a provided in the first locking piece 852; and a second fitting slit 854a provided in the second locking piece 854. Here, the locations of the first and second fitting slits 852a and 854a are determined such that when the two support sides 810 are compressed, the two fitting slits 852a and 854a are aligned with each other, as shown in FIG. 14B.

In other words, as a means for locking the compressed positions of the support sides 810 after compressing the support sides 810, the first and second locking pieces 852 and 854 are provided in the side bracket 800, with the first and second fitting slits 852a and 854a formed in the first and second locking pieces 852 and 854, respectively. Thus, when the locking shaft 846 is inserted into the first and second fitting slits 852a and 854a after aligning the first and second fitting slits 852a and 854a with each other by compressing the support sides 810, the side bracket 800 can be firmly clamped to the channeled rail 600.

Figure 18:
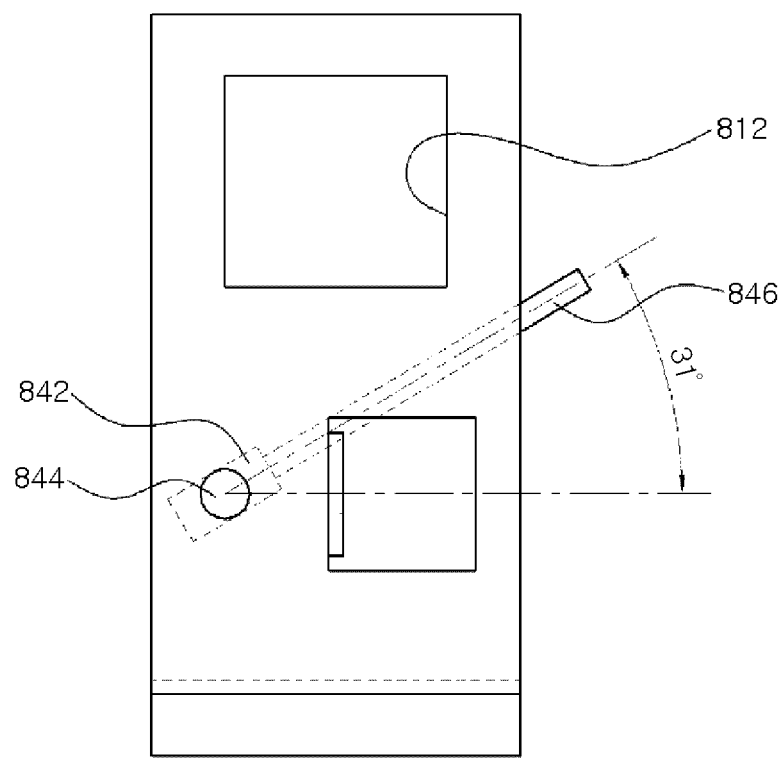
FIG. 18 is a front view showing an operation of the side bracket for holding the sprinkler joint according to the third embodiment of the present invention.
Figure 19:
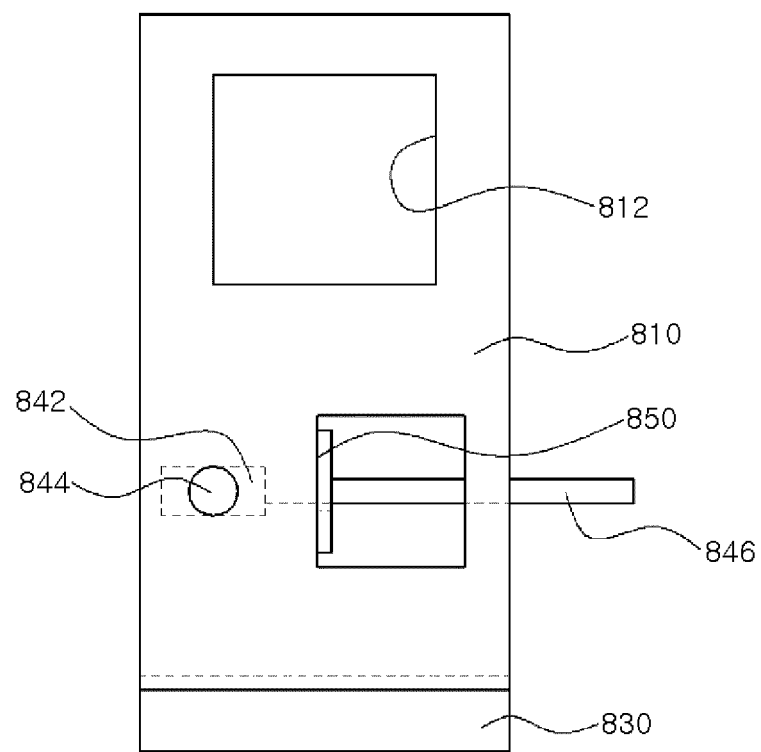
FIG. 19 is a front view showing a compressed state of the side bracket according to the third embodiment of the present invention.

FIG. 18 is a front view showing an operation of the side bracket for holding the sprinkler joint according to the third embodiment of the present invention. This drawing shows the predetermined locations of the first and second locking pieces 852 and 854.

In other words, the locations of the first and second locking pieces 852 and 854 may be determined such that when the locking shaft 846 is rotated about the rotating shafts 844, the diametric centerlines of the rotating shafts 844 can coincide with the centerlines of the first and second locking pieces 852 and 854.

Further, when the locking shaft 846 is rotated, the locking shaft 846 comes into contact with upper ends of the first and second locking pieces 852 and 854. At this time, the range of the angle of the locking shaft 846 may be set to about 30° to 35°.

The above-mentioned range of the angle of the locking shaft 846 is determined such that the locking shaft 846 can be easily inserted into the fitting slits 852a and 854a and can be firmly engaged with the locking piece part 850. Here, it is most preferred that the angle of the locking shaft 846 that is brought into contact with the first and second locking pieces 852 and 854 is set to 31°.

Further, the fitting slits 852a and 854a may be configured such that when the locking shaft 846 is completely fitted into the fitting slits 852a and 854a, the locking shaft 846 can be placed horizontally. In other words, the shaft holes 814 into which the rotating shafts 844 are inserted are formed at the same heights as the heights of the lower ends of the fitting slits 852a and 854a into which the locking shaft 846 is fitted, so that when the locking shaft 846 is completely fitted into the fitting slits 852a and 854a, the locking shaft 846 can be placed horizontally.

Here, the locking shaft 846 may be configured as a hollow pipe. When the locking shaft 846 has a hollow pipe shape, an axial slit 846a may be formed on the locking shaft 846 so as to give a clearance to the locking shaft 846.

Figure 16:
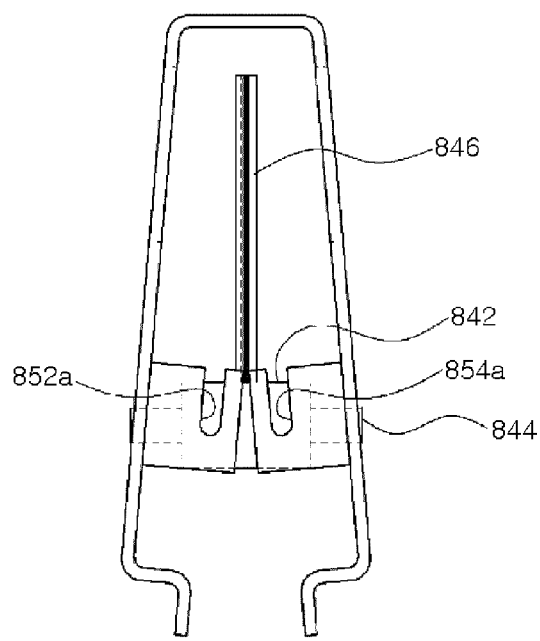
FIG. 16 is a side view showing an open state of the side bracket having a space adjustment unit according to the third embodiment of the present invention.
Figure 20:
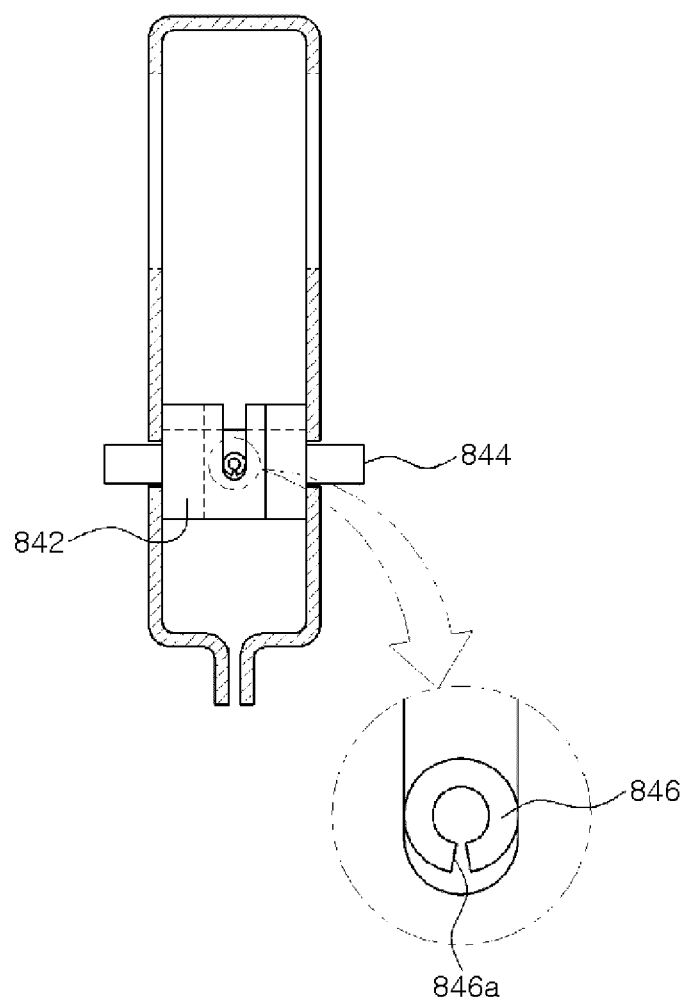
FIG. 20 is a sectional view showing the compressed state of the side bracket according to the third embodiment of the present invention.

The axial slit 846a may be formed along the lower part of the locking shaft 846, as shown in the enlarged views of FIGS. 16 and 20.

When the axial slit 846a is formed along the lower part of the locking shaft 846 as described above, the clearance of the locking shaft 846 acts in a transverse direction of the locking shaft 846 (in the transverse direction in FIG. 20).

The locking shaft 846 in which the clearance acts in the transverse direction of the locking shaft 846 as described above can be easily inserted into the fitting slits 852a and 854a while being rotated about the rotating shafts 844.

Further, when the locking shaft 846 is fitted in the first and second fitting slits 852a and 854a, the pair of support sides 810 is intended to be opened in opposite directions. At this time, due to the axial slit 846a, the locking shaft 846 is elastically opened in the fitting slits 852a and 854a so that the locking shaft 846 prevents the support sides 810 from being opened in the opposite directions.

Here, as shown in the enlarged view of FIG. 20, the axial slit 846a may be configured such that the opposed edge surfaces of the axial slit 846a are inclined to be further opened as the axial slit 846a goes in a radially outward direction toward the outer circumferential surface of the locking shaft 846.

Figure 17:
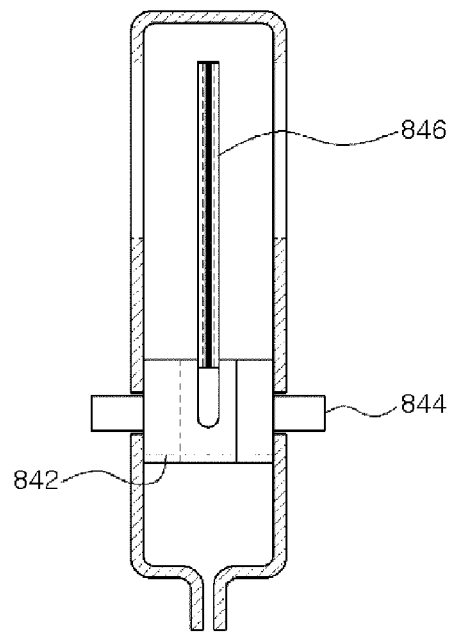
FIG. 17 is a sectional view showing the side bracket for holding the sprinkler joint according to the third embodiment of the present invention.

FIG. 16 is a side view showing an open state of the side bracket having the space adjustment unit according to the third embodiment of the present invention. FIG. 17 is a sectional view showing the side bracket for holding the sprinkler joint according to the third embodiment of the present invention.

The lengths of the rotating shafts 844 of the present invention may be determined such that even when the support sides 810 are opened from each other as shown in FIG. 16, the rotating shafts 844 can be maintained in the respective shaft holes 814. Thus, the assembled state of the space adjustment unit 840 with the support sides 810 can be always maintained.

Hereinbelow, the operation of the side bracket for holding a sprinkler joint according to the third embodiment of the present invention will be described.

To clamp the square bar 500 to the two channeled rails 600 that are arranged in parallel at regular intervals in a ceiling so as to hold ceiling boards, the side brackets 800 are placed on the two channeled rails 600, respectively. At this time, the locking shaft 846 of the space adjustment unit 840 is placed in an upright position at a location between the pair of support sides 810, as shown in FIG. 16.

Thereafter, the clamp parts 830 of each of the side brackets 800 are fitted over a wing 630 of an associated channeled rail 600, and the pair of support sides 810 is compressed while holding the support sides 810 by hand, thereby reducing the gap between the support sides 810 such that the first and second fitting slits 852a and 854a of the first and second locking pieces 852 and 854 are aligned with each other.

Thereafter, the locking shaft 846 is rotated to be inserted into the aligned first and second fitting slits 852a and 854a. Thus, the clamp parts 830 are compressed to be clamped to the wing 630 of the channeled rail 600, thereby firmly clamping the side bracket 800 to the channeled rail 600.

At this time, although the pair of support sides 810 is intended to be opened in opposite directions, the locking shaft 846 that is fitted in the first and second fitting slits 852a and 854a is elastically opened due to the axial slit 846a, so that the locking shaft 846 can prevent the support sides 810 from being opened in the opposite directions and can efficiently maintain the clamped state of side bracket 800 on the channeled rail 600.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A side bracket for holding a sprinkler joint, the side bracket being used to clamp a square bar to two channeled rails, the channeled rails being arranged in parallel at regular intervals so as to hold ceiling boards, with horizontal wings provided along opposite side edges of each of the channeled rails, and the square bar crossing the two channeled rails, the side bracket comprising:
    a pair of support sides;
    an upper connection part connecting upper ends of the support sides;
    clamp parts provided on lower ends of the support sides so as to be clamped to a channeled rail; and
    a space adjustment unit provided on lower parts of the support sides of the side bracket, said space adjustment unit including:
        a fixed part fixed to an inner surface of a remaining one of the support sides;
        a pair of elastic parts extending upward from the fixed part and having elasticity;
        a pair of pressing parts bent outward from the elastic parts; and
        a pair of grip parts extending upward from the pressing parts,
    wherein a guide hole is provided on one of the pair of support sides, and the space adjustment unit passes through the guide hole.

2. The side bracket of claim 1, wherein the space adjustment unit further includes:
    a fitting plate that can be fitted into a gap between the pair of pressing parts, the fitting plate being configured such that when the fitting plate is fitted into the gap between the pair of pressing parts, the fitting plate pushes the pressing parts in opposite directions, thereby holding the pressing parts at opened positions, and such that the fitting plate can be removably fitted into the gap between the pair of pressing parts by being slidably moved while being in contact with the support side having the guide hole; and
    a holder that is provided on the support side having the guide hole so as to hold the fitting plate such that even when the fitting plate is removed from the gap between the pair of pressing parts, the fitting plate is maintained in a contact position on the support side having the guide hole.

3. A side bracket for holding a sprinkler joint, the side bracket being used to clamp a square bar to two channeled rails, the channeled rails being arranged in parallel at regular intervals so as to hold ceiling boards, with horizontal wings provided along opposite side edges of each of the channeled rails, and the square bar crossing the two channeled rails, the side bracket comprising:
    a pair of support sides;
    an upper connection part connecting upper ends of the support sides;
    clamp parts provided on lower ends of the support sides so as to be clamped to a channeled rail; and
    a space adjustment unit provided on lower parts of the support sides of the side bracket, wherein the space adjustment unit is made of a plate spring material and a guide hole is provided on one of the pair of support sides, and the space adjustment unit passes through the guide hole.

* * * * *